Nov. 6, 1951     B. G. COPPING     2,574,017
TRUCK BODY FOR CARRYING BOTTLE CASES
Filed May 31, 1946     4 Sheets-Sheet 1

INVENTOR.
BRUCE G. COPPING
ATTORNEY

Nov. 6, 1951 — B. G. COPPING — 2,574,017
TRUCK BODY FOR CARRYING BOTTLE CASES
Filed May 31, 1946 — 4 Sheets-Sheet 2

INVENTOR.
BRUCE G. COPPING
ATTORNEY

Nov. 6, 1951  B. G. COPPING  2,574,017
TRUCK BODY FOR CARRYING BOTTLE CASES
Filed May 31, 1946  4 Sheets-Sheet 3

INVENTOR.
BRUCE G. COPPING
BY
ATTORNEY

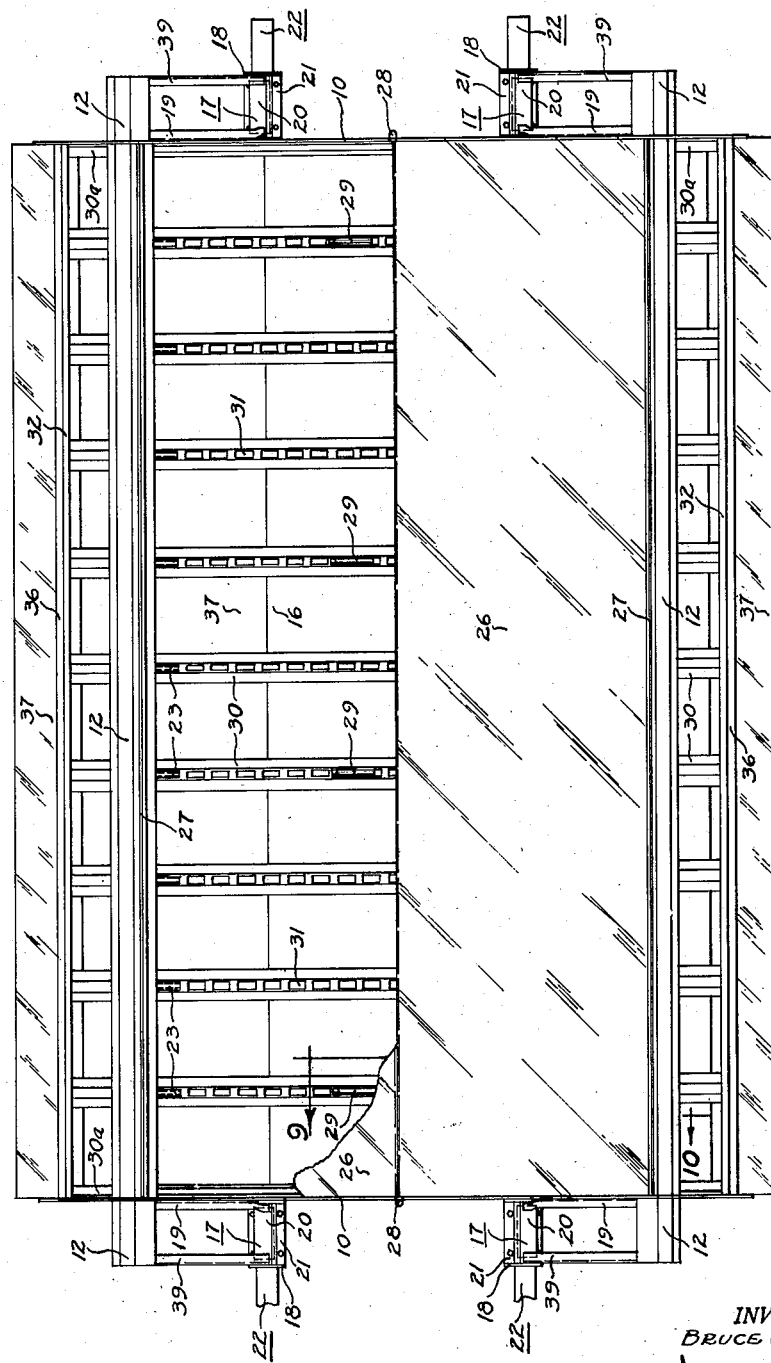

Patented Nov. 6, 1951

2,574,017

UNITED STATES PATENT OFFICE 2,574,017

TRUCK BODY FOR CARRYING BOTTLE CASES

Bruce G. Copping, Atlanta, Ga., assignor to The Coca-Cola Company, Wilmington, Del., a corporation of Delaware Application May 31, 1946, Serial No. 673,465

5 Claims. (Cl. 296—3)

This invention relates to the automotive industry, and more particularly to a new and improved truck body intended to be used by bottlers of soft drinks in the transporting of their product from bottling plants to retail outlets and other points of distribution.

In handling soft drinks, as well as bottled beverages generally, it is customary to place the individual containers in crates or shells which may be conveniently moved about, said shells then being placed in trucks and transported as merchandising conditions require. In this connection, special truck bodies are required, it being apparent that a number of factors must be considered in their construction. For example, there must be ready access to the crates, since frequently a limited number are put off at each stop. Again, the bottled product must be carried safely with a minimum of breakage or other loss. It is also of prime importance that a maximum number of cases be incorporated into each load, thereby eliminating unnecessary returns to the plant for additional supplies, such trips entailing both loss of time and increased operating costs to the vehicles employed.

An object of the instant invention is to provide a truck body in which the weight of the load is supported from the top by means of an overhead truss structure, thereby giving the body increased carrying capacity.

Another object is to provide strength and rigidity in a device of the instant type.

A still further object is to provide ease of access, in a beverage truck body.

Another object is to provide carrying safety in such a device.

Another object is to provide simplicity of construction, and a minimum of parts in such a body.

Another object is to provide over-all lightness in a truck body.

Another object is to make possible economy of manufacture and ease of repair in a structure of the instant type.

Another object is to improve sanitation in a beverage truck body, by facilitating ease of cleaning thereof.

These and other objects made apparent during the further progress of this specification are made possible by means of my improved truck body construction, a full and complete understanding of which is facilitated by reference to the drawings herein, in which:

Fig. 7 is also an enlarged, fragmentary detail taken along the line 7—7 of Fig. 1, looking in the direction of the arrows;

Fig. 8 is an enlarged, top view, fragmentary in part, illustrating the structure shown in Fig. 1;

Figure 1:
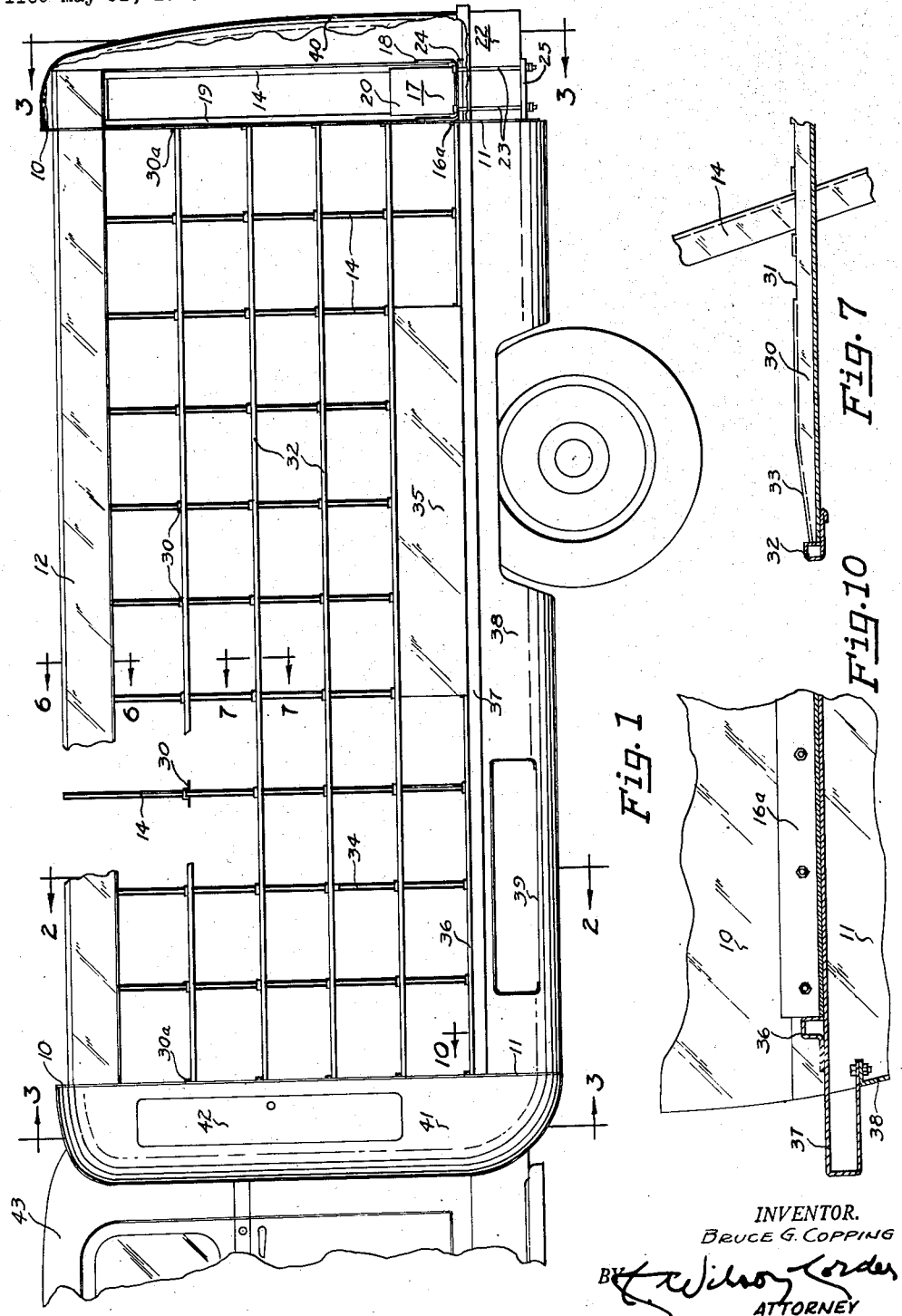
Fig. 1 is a side view, fragmentary in part, illustrating my truck body.
Figure 9:
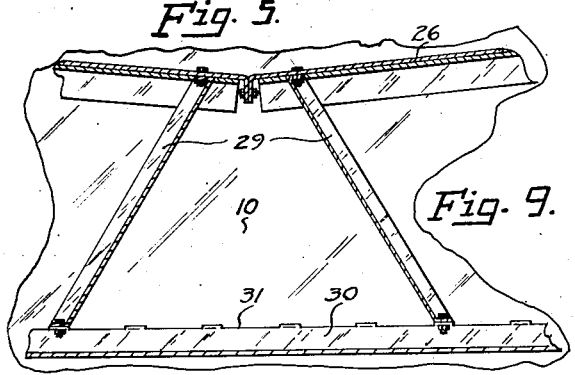
Figure 3:
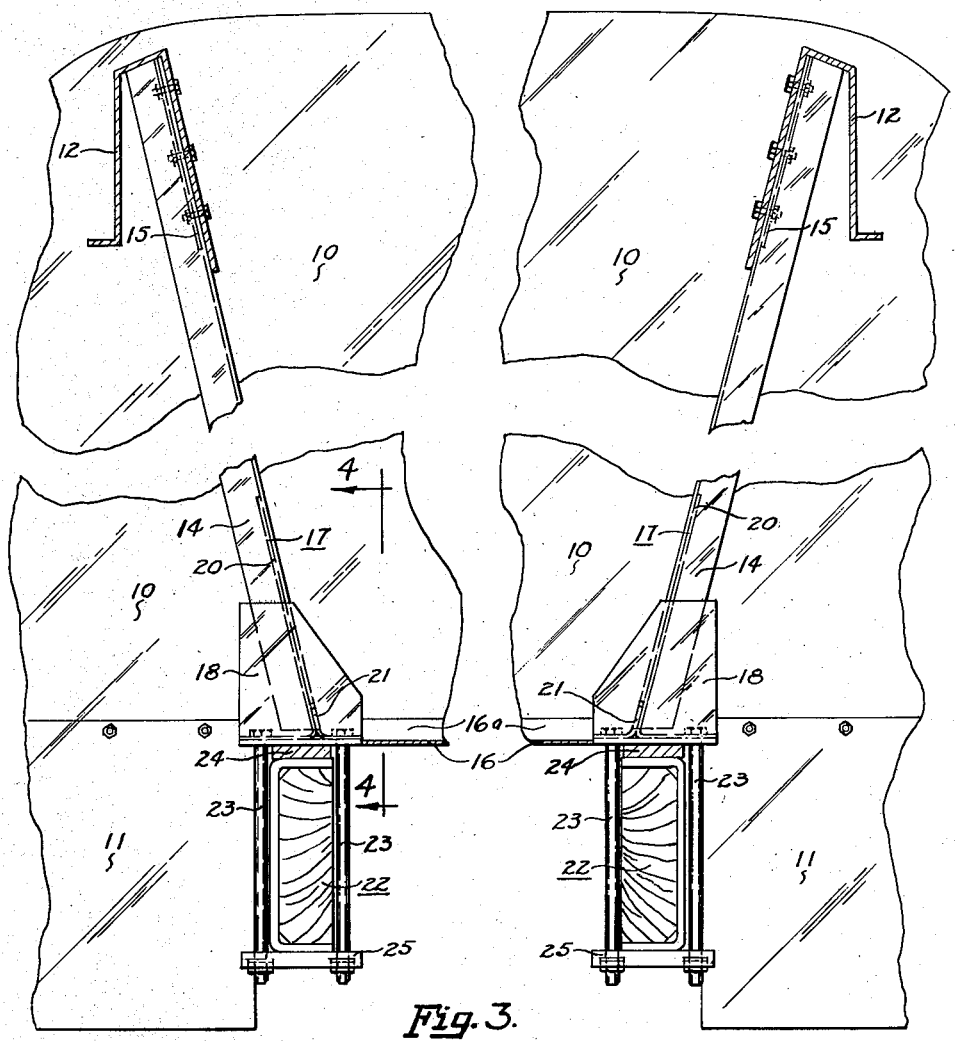
Fig. 3 is an enlarged end view, taken substantially along the line 3—3 of Fig. 1, looking in the direction of the arrows.

Fig. 9 is an enlarged fragmentary view of certain rough detail, taken along the line 9—9 of Fig. 8; and Fig. 10 is an enlarged fragmentary view of certain bottom detail, taken along the line 10—10 of Figs. 1 and 8.

Figure 4:
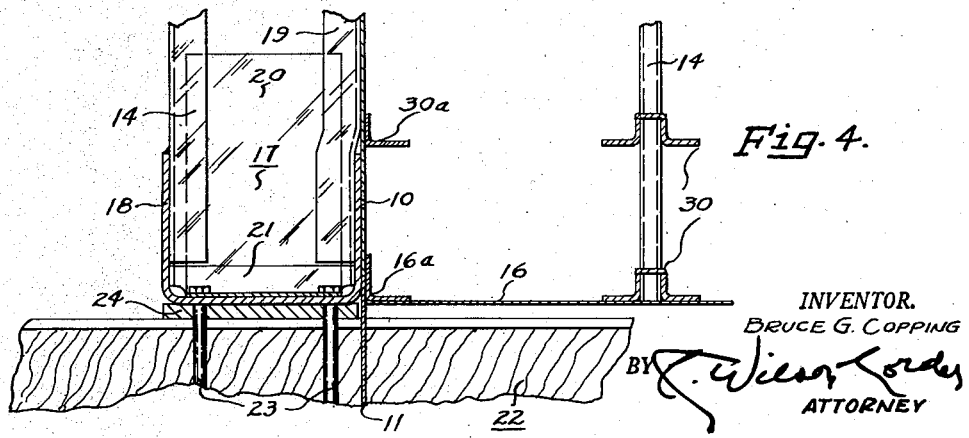
Fig. 4 is an enlarged view, fragmentary in part, taken along the line 4—4 of Fig. 3, looking in the direction of the arrows.

Referring now to the drawings, Fig. 1, the instant body, consists of a pair of upper bulkheads 10 and lower bulkheads 11, united by a pair of overhead, horizontal truss members 12. A plurality of downwardly extending supports 14 are securely anchored to said truss members, as by being bolted thereto, in association with tie-plates 15. At their bottoms, said elements support the floor 16 of the body in conjunction with support assembly 17 (Fig. 4), which comprises a base angle support 18, bulkhead angle supports 19, tie-plates 20, and tie anchor supports 21.

Assembly 17 is securely fastened to truck chassis 22 by means of attaching bolts 23, a spacer block 24 being interposed between angle members 18 and chassis 22, and a plate support 25 is positioned beneath said chassis to provide a more secure anchorage in conjunction with bolts 23 at this point. It will be noted that compression members 19 and 14, in conjunction with bulkheads 10 serve to securely support truss members 12 at the front and rear of the body respectively, and that intermediate members 14 are in turn suspended from said truss members in tension, and serve to support the case racks and the floor of the body per se.

Figure 2:
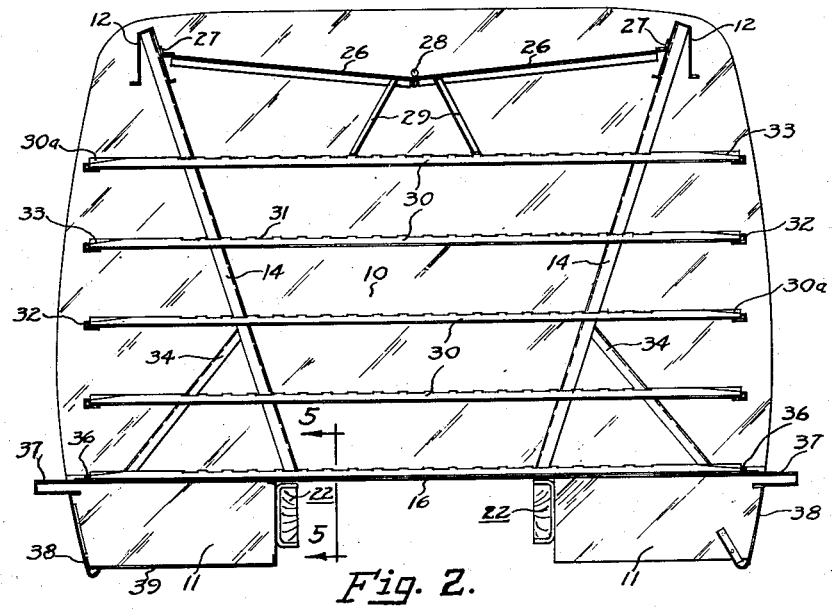
Fig. 2 is a vertical sectional view of the structure shown in Fig. 1, taken approximately along the line 2—2 of the figure, looking in the direction of the arrows.
Figure 5:
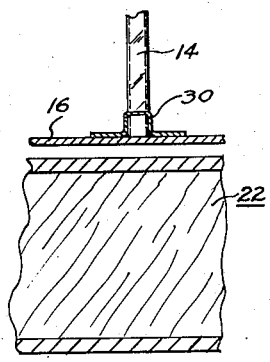
Fig. 5 is an enlarged fragmentary view illustrating detail along the line 5—5 of Fig. 2 looking in the direction of the arrows.
Figure 6:
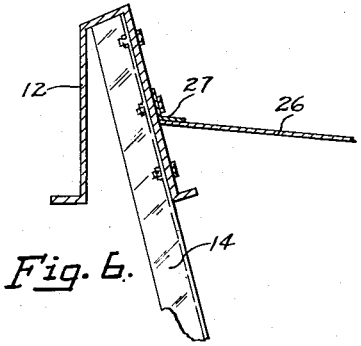
Fig. 6 is an enlarged detail view, fragmentary in part, taken along the line 6—6 of Fig. 1, looking in the direction of the arrows.

A pair of roof members 26 (Fig. 2) are attached as by bolting to truss members 12, through roof attaching angles 27, said roof members also being bolted together along their center meeting line, and a roof drain 28 is provided at this point. A pair of roof supports 29 may be bolted to respective sections of the roof.

A series of flanged-channel case supports 30 are positioned to extend horizontally and transversely of the body at suitably spaced intervals, said case supports being carried by elements 14, and having therein a series of apertures 31 making for adjustability in the assembling of bodies of the instant type, and further contributing to the lightness of the entire assembly. Angular case retainer members 32 are secured to the outside edges of elements 30, thereby serving to retain cases in the body during the time that they are being transported, yet permitting easy removal thereof. The ends of case supporting members 30 are preferably slightly cut away or tapered as at 33 to further facilitate such removal.

The case-supporting elements in bulkheads 10 are designated by numerals 30a, these being angular members; and there is likewise provided floor tie angles 16a, which serve to unite the bulkheads and floor of the truck at the points indicated.

A plurality of supplementary supports 34 are preferably positioned in the lower portion of the instant body, said members being welded to diagonal supports 14 and passing through additional holes 31 of case-supporting members 30, to be welded or otherwise suitably attached to element 37. Roof supporting elements 29 are anchored at their bottoms to adjacent case-supporting elements 30.

A wheel housing 35 is provided in the body to accommodate the wheels of the truck with which it is associated.

A pair of floor case container elements 36 are secured along the ends of lower case-supporting elements 30, and a rub rail 37 is formed adjacent these points. A lower fairing element 38 is in turn secured to said rub rail (Figs. 1 and 10); and a tool compartment 39 having a door (not shown) may be formed under the body at the point indicated.

A rear fairing 40 covers the body at the point indicated, imparting a smooth and finished effect to the rear of the structure; and front fairing 41 performs a similar function at the forward end of said body. An advertising compartment 42 is formed at this point in order that dead space at the front of the body may be utilized for the carrying of advertising or other similar flat material. 43 is the cab of the truck, with which the instant body is associated.

Over-all side doors (not shown) for the purpose of protecting cases of beverage being transported, particularly in very cold weather, and likewise for affording outside advertising space, may be associated with the sides of the instant body if desired.

The operation of said body should be obvious from the foregoing description, it being apparent that cases of bottled beverages readily slide into the compartments provided by diagonal supporting members 14 and case-supporting elements 30, and are retained therein by end members 32. By virtue of supporting the major portion from above, by in effect hanging such from truss members 12, a new and unique principle of body construction is achieved, having as one of its main advantages the provision of greater carrying space in a truck body, this being important for economic reasons mentioned heretofore. It is further apparent that cases may be readily removed from the body; that the entire structure is simple, easy to produce on a mass basis, and to assemble in small shops everywhere; light of weight; easy to clean, and otherwise desirable for its intended purposes.

While there has been described certain specific structure herein, this is not to be taken as a limiting factor, but rather, by way of example, and accordingly, the appended claims are to be given an interpretation, construction and scope fairly in keeping with my contribution to the art.

I claim:

1. In a truck body, a pair of upper bulkheads, a pair of lower bulkheads adjacent thereto, a pair of longitudinally extending overhead truss members positioned on opposite sides of the upper portions of said upper bulkheads, supplemental supporting means at the rear of one set of upper and lower bulkheads, a plurality of downwardly and diagonally extending supports secured to said truss members at the tops and being substantially carried thereby, a plurality of transversely extending case supporting members positioned at spaced intervals with said first mentioned supporting elements and being carried thereby, a floor adjacent the lower ends of said supporting elements, a pair of rub rails on opposite sides of said floor, a pair of lower fairing elements secured to said rub rails on opposite sides of the truck body, supplemental bracing members extending diagonally from said rub rails and passing through said case supporting elements to be anchored to said first mentioned supports, and a pair of roof members supported by said overhead truss members.

2. In a truck body, a pair of upper bulkheads and a pair of lower bulkheads adjacent thereto, a plurality of longitudinally extending truss members uniting said upper bulkheads and being partially supported thereby, a supplemental supporting assembly for said truss members, including a plurality of base angle supports, bulkhead angle supports secured thereto, tie-plates and tie anchor supports adjacent said angle supports, means for securing said supplemental supporting assembly to the chassis of a truck; a plurality of downwardly extending angular supporting elements secured to said truss members on opposite sides thereof at spaced intervals, a plurality of transversely extending flanged-channel case supporting members carried by downwardly extending supporting elements, angular case retaining members secured to the outside edges of said case carrying elements, a roof secured to said truss members, a bottom adjacent the lower ends of said downwardly extending supporting elements and being substantially carried thereby, a pair of rub rails on adjacent sides of said bottom, fairing elements adjacent said rub rails, a wheel housing for the body, a tool compartment positioned in said body, and a compartment for carrying advertising material adjacent one end of said truck body 3. In a truck body, a floor structure, a plurality of widely spaced longitudinally extending overhead truss members, means for supporting said members at their respective ends, a plurality of downwardly and inwardly extending supporting members secured at their upper portions to said truss elements and being carried thereby, and being connected with the floor structure at their lowermost ends, said supports transferring a load outwardly and upwardly away from the chassis sills of a truck; a plurality of case supporting members extending transversely of the body and being fixedly mounted to said first mentioned supports so as to carry the case load to said overhead truss members, thereby forming a laterally rigid structure; and a plurality of diagonally extending supplementary supports positioned in the lower portion of the body and contacting the floor thereof at one end and the case supporting elements at the other.

4. In a truck body, a floor structure, a plurality of widely spaced longitudinally extending overhead truss members, means for supporting said members at their respective ends, a plurality of downwardly and inwardly extending supporting members secured at their upper portions to said truss elements and at their lower ends to said floor structure, said supporting members transferring a load outwardly and upwardly away from the chassis sills of a truck; and a plurality of case supporting members extending transversely of the body and being fixedly mounted to said first mentioned supports so as to carry the case load to said overhead truss members, thereby forming a laterally rigid structure.

5. In a truck body, a floor structure, a plurality of widely spaced longitudinally extending overhead truss members, means for supporting said members at their respective ends, a plurality of downwardly and inwardly extending supporting members secured at their upper portions to said truss elements and being carried thereby, said supporting members transferring a load outwardly and upwardly away from the chassis sills of a truck; a plurality of case supporting members extending transversely of the body and being fixedly mounted to said first mentioned supports so as to carry the case load to said overhead truss members, thereby forming a laterally rigid structure; a plurality of diagonally extending supplementary supports positioned in the lower portion of the body and contacting the floor thereof at one end and the case supporting elements at the other, and a roof for the composite body.

BRUCE G. COPPING.

REFERENCES CITED

The following references are of record in the file of this patent:

UNITED STATES PATENTS

| Number | Name | Date |
|---|---|---|
| 298,252 | Sternberg | May 6, 1884 |
| 1,108,634 | Spangler | Aug. 25, 1914 |
| 1,425,596 | Kramer | Aug. 15, 1922 |
| 1,530,779 | LeTourneau | Mar. 24, 1925 |
| 1,896,717 | Mott | Feb. 7, 1933 |
| 1,998,853 | Simning | Apr. 23, 1935 |
| 2,061,673 | Robinson | Nov. 24, 1936 |
| 2,152,568 | Renno | Mar. 28, 1939 |
| 2,191,572 | Maier | Feb. 27, 1940 |
| 2,205,575 | Nabors | June 25, 1940 |
| 2,318,794 | Parker, Jr. | May 11, 1943 |

FOREIGN PATENTS

| Number | Country | Date |
|---|---|---|
| 884,981 | France | May 17, 1943 |